United States Patent [19]

Drake

[11] Patent Number: 4,698,459

[45] Date of Patent: Oct. 6, 1987

[54] BATTERY CONNECTION PROTECTOR CASE

[75] Inventor: Robert C. Drake, Cincinnati, Ohio

[73] Assignee: Dorman Products, Inc., Cincinnati, Ohio

[21] Appl. No.: 916,526

[22] Filed: Oct. 8, 1986

[51] Int. Cl.[4] ...................... H01R 13/52; H01R 13/50; H01R 13/44; H01M 2/02

[52] U.S. Cl. .................................. 174/138 F; 429/65; 439/522; 439/892

[58] Field of Search ................ 174/92, 138 F; 339/36, 339/44 R, 114, 115 R, 115 C, 116 R, 116 C, 208, 224, 230 R, 231; 429/65, 121, 175

[56] References Cited

U.S. PATENT DOCUMENTS

| | | | |
|---|---|---|---|
| 1,635,351 | 7/1927 | Spurgeon | 429/121 X |
| 2,052,081 | 8/1936 | Campbell | 429/121 X |
| 3,354,454 | 11/1967 | Rueger | 339/208 X |
| 3,617,615 | 11/1971 | Balzer | 174/138 F X |
| 3,633,154 | 1/1972 | Glantz | 339/116 R |

FOREIGN PATENT DOCUMENTS

| | | | |
|---|---|---|---|
| 175121 | 8/1906 | Fed. Rep. of Germany | 429/121 |
| 1580037 | 11/1980 | United Kingdom | 339/44 R |

*Primary Examiner*—Laramie E. Askin
*Attorney, Agent, or Firm*—Wood, Herron & Evans

[57] ABSTRACT

A case for protecting the electrical connection of a storage battery terminal post with the end of a battery cable attached to that post. The case is in the form of a one-piece molded housing that incorporates an alignment and latch structure which makes it easy for the average car owner to open and close the case for accessing the connection when desired.

8 Claims, 5 Drawing Figures

BATTERY CONNECTION PROTECTOR CASE

This invention relates to storage batteries. More particularly, this invention relates to a case for protecting the electrical connection between the terminal post of a storage battery and the end of a battery cable attached to that post.

Every automobile of today makes use of a storage battery for automatic starting. The terminal posts of that battery are connected with the electrical system of the car by separate battery cables, and the end of each battery cable is normally clamped to one of the battery terminal posts by a nut and bolt operated clamp arrangement. This electrical connection of each battery cable end with a battery terminal post is normally open to atmosphere underneath the car hood. This leads to significant corrosion, or other undesirable foreign material, build-up on these electrical connections over the useful life of the automobile. As a result, one or both of the electrical connections between the battery cables and the battery may deteriorate over time. Such deterioration can occur even to the point where there is not a sufficient electrical connection remaining by which the automobile can be automatically started through use of the battery power when the car ignition key is turned by the driver.

Accordingly, it has been the primary objective of this invention to provide a novel protector case which encloses the connection between a battery cable end and a storage battery terminal post on all sides in order to protect that connection against the potentially adverse effects of corrosion or other foreign material buildup on that connection during normal operation, while still providing easy access to that connection when required for service or maintenance. In accord with this objective, applicant has invented a molded one-piece protector case that incorporates a base component and a cap component hingedly connected together, the base fitting over the battery terminal post, and the cap enclosing the electrical connection of that post with the battery cable end when the protector case is closed. The case includes latch structure for holding the cap in close assembly with the base. The case also includes alignment structure for properly orienting the case relative to the battery cable as well as for properly aligning the cap with the base in the closure mode.

Other objectives and advantages of the invention will be more apparent from the following detailed description taken in conjunction with the drawings in which.

Figure 1:
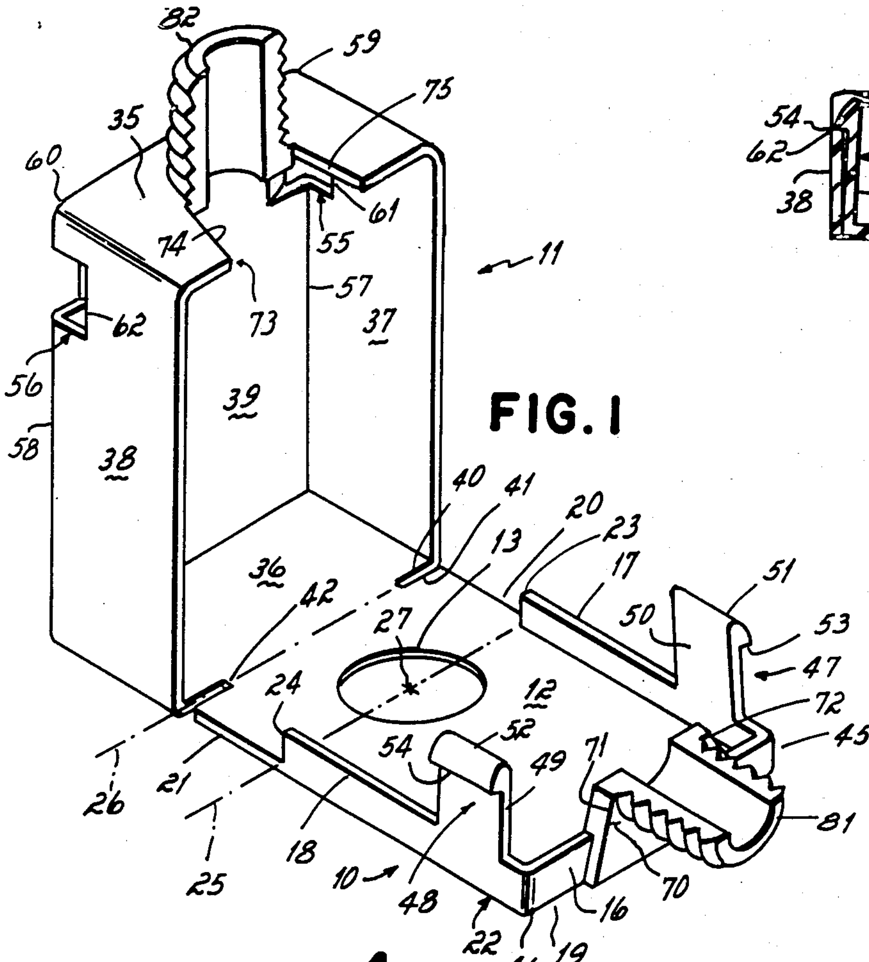
FIG. 1 is a perspective view of a protector case in accord with the principles of this invention.
Figure 4:
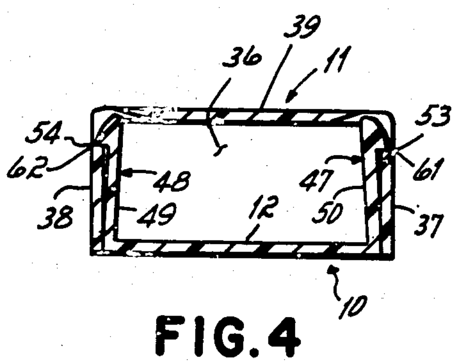
FIG. 4 is a cross sectional view taken along lines 4—4 of FIG. 2.

A protector case in accord with the principles of this invention includes two basic components, a base 10 and a cap 11; FIG. 1. The base 10 is comprised of a flat floor 12 of generally rectangular configuration, a bore 13 being cut out in that floor of slightly larger diameter than terminal post 14 of battery 15. The base 10 further includes an upstanding lip or rim 16–18 that extends along the front edge 19 and part way down each side edge 20, 21 of the floor, thereby providing a generally U-shaped lip that partially extends around the periphery 22 of the floor. Note particularly the lip ends 23, 24 stop, i.e., do not extend beyond a phantom line 25 generally parallel to the hinge line 26 of the cap 11 with the base 10, that phantom line 25 passing through the center 27 of the terminal post bore 13 cut in the floor. This ensures access to the nut and bolt 28 of the clamp 29 which connects the battery cable end 30 and the battery terminal post 14 when the case is in use. This lip or rim 16–18 is sized to fit inside of the cap 11, and to aid in alignment of the cap with the base 10, when the cap and base are in the closure attitude shown in FIGS. 2–5.

The cap 11 includes a front wall 35, a rear wall 36, two opposed side walls 37, 38, all of a generally rectangular configuration, and a top wall 39. The cap 11 is designed to interfit with the base 10, as shown in FIGS. 2–5, to provide a closed housing assembly. The depth D of the walls 35–38 is such that a battery terminal post 14 and a battery cable end clamp 29 will fit within the housing when it is in the closure attitude. The bottom edge 40 of the rear wall 36 is hingedly connected to the rear edge 41 of the floor 12 by a hinge 42 that is formed integral with the cap 11 and the base 10. Preferably the protector case of this invention is fabricated of a material such as nylon or polypropylene; this material can be molded to provide a case of one-piece configuration with the integral hinge 42 as noted. Also, this material provides substantial resistance to oil, water, acid, or elevated temperatures which provides the case with a prolonged useful life in its normal use environment, i.e., a storage battery under a vehicle hood.

The protector case of this invention also includes a latch structure which holds the cap 11 in the closure attitude with the base 10, yet which permits easy access to the battery cable end 30/terminal post 14 connection when desired for maintenance purposes. This latch structure includes, adjacent to and mounted at each front corner 45, 46 of the base 10, a latch 47, 48 including a flexible latch post 49, 50, the latch posts extending upward and slightly inward from the top edge of the side sections 17, 18 of the lip of the base, i.e., from the side edges 20, 21 of the base. Further, the top or free end of each latch 47, 48 is provided with a rounded nose 51, 52 to permit easy access into latch access ports 55, 56 in the cap 11, each of those noses terminating in an undercut latch face 53, 54. The opposed latch access ports 55, 56 are located in the top wall/side wall edges 57, 58 adjacent the front corners 59, 60 of the cap. These latch access ports 55, 56 each define a latch edge 61, 62 structured to cooperate with the latch face 53, 54 of a latch 47, 48 so as to hold the cap 11 in closure attitude with the base 10. The latch posts 49, 50 are inherently flexible due to the material from which the case 10, 11 is molded, and this natural resilience permits the latches 47, 48 to flex out of the way as the cap 11 is being closed relative to the base 10 until the latch faces 53, 54 flex over the latch edges 61, 62. Note particularly that the sizing and configuration of the latches 47, 48 relative to the sizing and configuration of the latch access ports 55, 56 is such as to substantially close those ports to the environment, and is such that the latch noses 51, 52 do not protrude beyond the exposed faces of the cap, when the case is in the closure attitude shown in FIGS. 2–4.

The protector case 10, 11 of this invention also includes alignment structure which permits the cap 11 to be readily aligned in latching position with the base 10 as it is translated from the full open position shown in FIG. 1 to the full closure position shown in FIGS. 2–5 when a battery cable 63 extends into the case. In this regard, the alignment structure includes a truncated guide wall 70 that extends upwardly from the top edge of the lip 16 on the front edge 19 of the base 10. The side edges 71, 72 of this truncated guide wall 70 on the base 10 cooperate with a similarly configured and sized truncated cut-out 73 having side edges 74, 75 in the front wall 35. So, these guide edges 71, 72, 74, 75 partially carried by the base 10 and partially carried by the cap 11 aid in ensuring that the cap is properly aligned relative to the base as it is closed. As the cap achieves its full closure position with the base, the upstanding rim 16–18 cooperates with the inner surfaces of the front 35 and side walls 37, 38 of the cap to ensure that the cap maintains alignment with the base 10 in the closure attitude.

Figure 2:
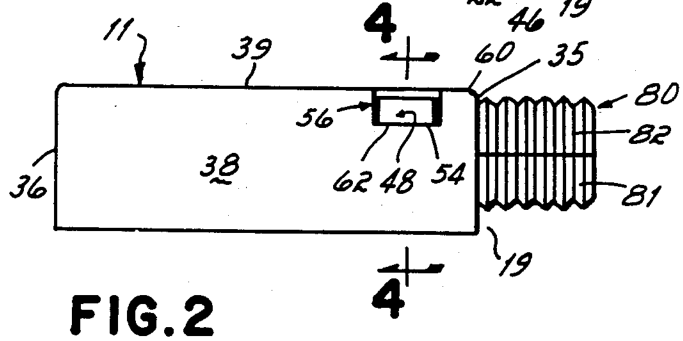
FIG. 2 is a side view of the case shown in the closure mode.
Figure 3:
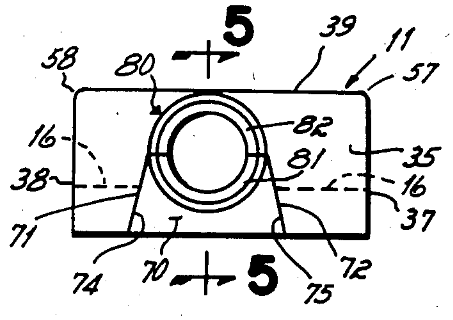
FIG. 3 is an end view of the case shown in FIG. 2.
Figure 5:
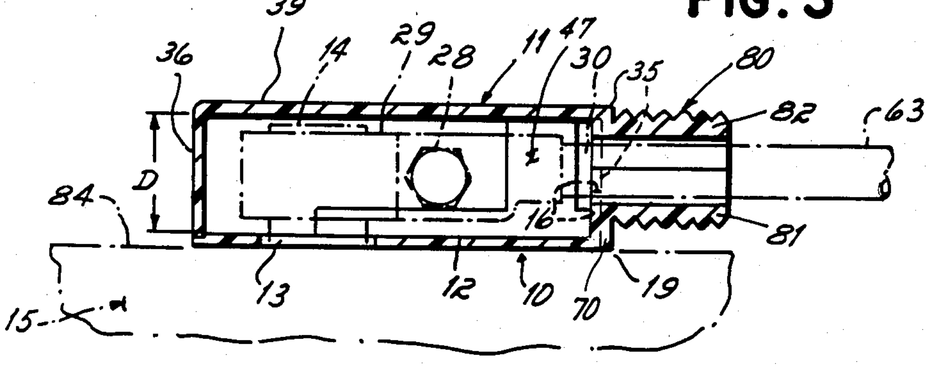
FIG. 5 is a cross sectional view taken along lines 5—5 of FIG. 3, and showing the case in assembly with a storage battery terminal post.

The alignment structure further includes a cable alignment collar 80 that projects outwardly from the front wall 35, 70 of the case when it is in the closure attitude as shown in FIGS. 2 and 5. This cable collar 80 is partially carried by the base 10 and partially carried by the cap 11. The cable collar 80 is in the form of a bottom half cylinder 81 fixed to and extending outwardly from the truncated guide wall 70 and a top half cylinder 82 fixed to and extending outwardly from the front wall 35. Accordingly, when the cap 11 is closed relative to the base 10, and when a battery cable is connected to terminal post 14, the case is automatically oriented on the battery 15 by virtue of the cable being introduced into the case through the cable collar 80.

Use of the battery connection protector case 10, 11 is illustrated in FIG. 5. Note particularly that the base 10 is initially installed so that the battery terminal post 14 extends up through bore 13 in the floor 12, and so that the floor lies flush on the top surface 84 of the battery 15. Of course, this initial orientation of the case onto the battery terminal post 14 must necessarily be achieved with the battery cable 63 and end clamp 29 disconnected from the terminal post. Subsequently, and with the cap 11 open, the battery cable 63 is clamped onto the terminal post, and is tightened in position by the nut and bolt 28. Access to the mechanic's wrench is simple and unhindered because of the structure of the base, i.e., the latch posts 49, 50 and cable collar 80 are removed from the nut and bolt 28 area, and the U-shaped rim 16–18 does not extend upwardly a sufficient distance to cause interference. With the battery cable 63 now clamped on the battery terminal post 14, and with the cable collar 80 aligned with the cable, the cap 11 is then simply pivoted closed on the integral hinge 42 into the closure attitude shown in FIG. 5. All that is required to achieve a latched closure is simply pivoting of the cap 11 from the full opened attitude shown in FIG. 1 to the full closure attitude in FIG. 5 because the alignment structure 71, 72, 74, 75 and rim 16–18 will ensure that the cap is properly aligned with the base in the closure attitude as it is pivoted closed, and because the latch posts 49, 50 will flex out of the way as they ride against the inner surface of the side walls 37, 38 until the latch faces 53, 54 flex over and latch onto the latch edges 61, 62 in the latch access ports 55, 56. In this full closure attitude, therefore, the connection between the battery cable end 30 and the battery terminal post 14 is substantially protected from atmosphere because the latch posts 49, 50 fill the latch access ports 55, 56, thereby housing the electrical connection in a closed environment.

Having described in detail the preferred embodiment of my invention, what I desire to claim and protect by Letters Patent is:

1. A protective case for an electrical connection between a battery cable end and a battery terminal post, said case comprising a base having a floor, said floor having a bore through which said post can be received, a cap having front, rear, side, and top walls, said cap cooperating with said base to provide a substantially closed housing within which said connection is located when said case is in use, a hinge connecting the rear edge of said base to said rear wall of said cap, said base, cap and hinge all being of a one-piece molded construction, alignment structure partially carried by said base and partially carried by said cap, said base and cap alignment structure cooperating upon closure of said cap onto said base for ensuring that said base and cap are properly interfitted in order to provide a substantially closed housing, said alignment structure comprising a truncated guide wall portion which forms a part of the front wall of one of said base and said cap, and a truncated cutout section in the front wall of the other of said base and said cap, said truncated guide wall cooperating with said truncated cutout in order to guide said cap into proper closure relations with said base, latch structure partially carried by said base and partially carried by said cap for retaining said cap in a closure attitude with said base; said latch structure comprising a latch access port defined in said cap and a latch flexibly connected to said base, said latch automatically engaging said latch access port upon closure of said cap with said base, said latch having a latch face, and said latch access port having a latch edge, said latch face and latch edge being adapted to overlie one another in latching relation, said latch being of a size and configuration relative to the size and configuration of said latch access port so as to not extend beyond the outer surfaces of said cap, said latch structure being incorporated with said case as part of said one-piece molded construction, and a cable collar including a cable collar section carried by said base and a cable collar section carried by said cap, that cable collar section carried by each of said base and cap being centrally oriented relative to said truncated guide wall and said truncated cutout.

2. A protective case as set forth in claim 1, said case further comprising a guide lip section on each side edge of said base, each guide lip section extending upwardly from said floor, and each guide lip section being adapted to be received internally of said cap upon closure of said cap onto said base.

3. A protective case as set forth in claim 2, wherein said hinge defines a hinge line generally parallel to the front wall of said cap, and neither rear end of said guide lip sections extends beyond a phantom line parallel to said hinge line that also includes the center of said bore.

4. A protective case as set forth in claim 3, said alignment structure further including a guide lip section upstanding along the front edge of said base, said front guide lip section cooperating with said side guide lip sections to establish a generally U-shaped guide lip extending upwardly from said floor.

5. A protective case as set forth in claim 2, said latch further comprising a flexible post, said flexible post extending upwardly from one of said guide lip sections, said flexible post thereby being oriented interiorly of said cap when said cap is closed with said base.

6. A protective case as set forth in claim 1, said latch access port being positioned adjacent a top edge of said cap, and said latch further comprising a flexible post that extends upwardly from and is molded integral with said floor, a latch nose being mounted on the free end of said flexible post, said flexible post being oriented on the inside of said case when said cap is closed relative to said case.

7. A protective case as set forth in claim 1, wherein said cable collar section carried by said cap extends from the front wall of said cap and said cable collar section carried by said base extends from a front wall on said base, said cable being receivable into said case through said front walls when said cap and base are closed, and said hinge defining a hinge line generally parallel to said front walls.

8. A protective case as set forth in claim 7, wherein said cable collar section carried by said cap comprises an upper half cylindrical portion fixed to the front wall of said cap and extending outwardly therefrom, and said cable collar section carried by said base comprises a lower half cylindrical portion fixed to the front wall of said base and extending outwardly therefrom.

* * * * *